April 21, 1953  E. A. BRANSCHOFSKY  2,636,090
VEHICLE BRAKE LINING WEAR INDICATOR
Filed July 13, 1950
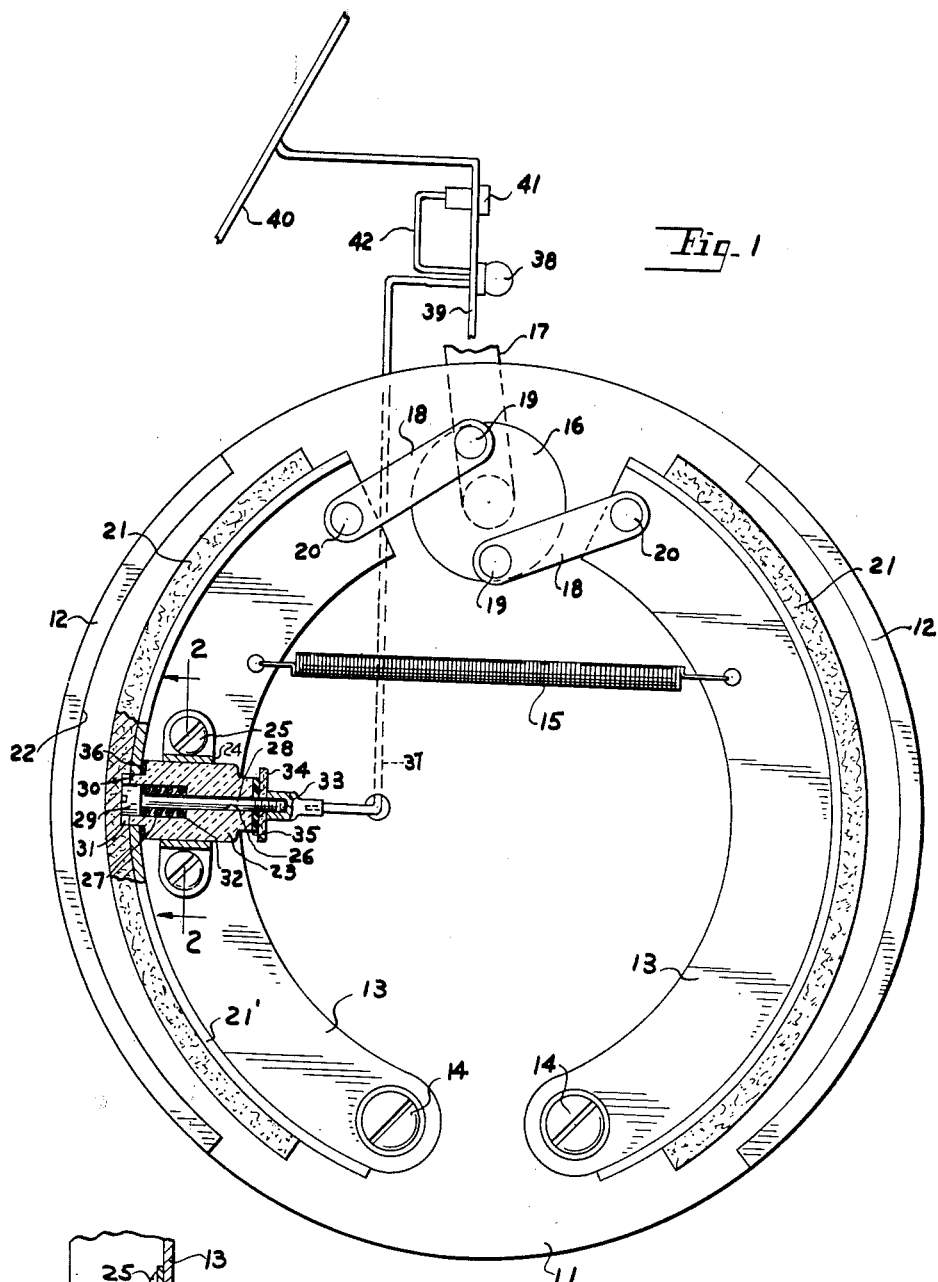
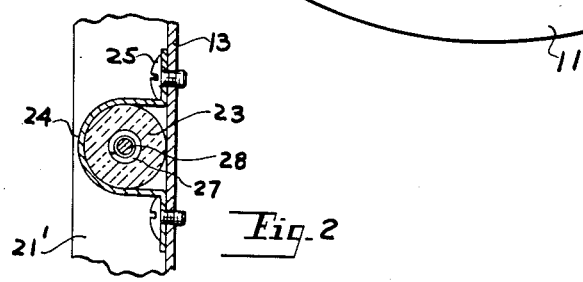
INVENTOR.
EDWARD A. BRANSCHOFSKY.
BY
Wisner & Sloman
ATTORNEYS Patented Apr. 21, 1953

2,636,090

UNITED STATES PATENT OFFICE 2,636,090

VEHICLE BRAKE LINING WEAR INDICATOR

Edward A. Branschofsky, Detroit, Mich.

Application July 13, 1950, Serial No. 173,667

1 Claim. (Cl. 200—52)

This invention relates to a brake lining wear indicator, and more particularly to a safety signal device associated with the brake shoe of a vehicle for giving an audible or visual signal to the driver when the brake linings are substantially worn out to thereby indicate the need for replacement to prevent scoring of the brake drums.

It is the object of the present invention to provide a safety signal device associated with the vehicle brake and which is substantially simple in construction to provide a positive indicator when the brake linings have worn to the danger point or where the wear is such that further use will result in scoring of the brake drums.

This and other objects will be seen from the following specification and claim in conjunction with the appended drawing in which—

Fig. 1 is a side elevational view partially in section illustrating the relationship of the brake shoe, lining and drum and the brake lining wear signal device mounted upon the said brake shoe; and Fig. 2 is a section on line 2—2 of Fig. 1.

It will be understood that the above drawing illustrates merely a preferred embodiment of the invention and that other embodiments are contemplated within the scope of the claim hereafter set out.

Referring to the drawing the vehicle brake assembly includes the wheel element 11 which has secured thereto upon opposite sides the arcuate brake drums 12. The brake shoes 13 with pivotal mountings 14 at their lower ends are interconnected adjacent their upper ends by the coil spring 15. Rotatable disc 16 with actuating lever 17 joined thereto is connected to the upper ends of the brake shoes 13 by the links 18 which are respectively joined pivotally at 19 to opposite sides of operating disc 16 and pivotally joined to the upper ends of the brake shoes 13 by the pivotal connections 20.

A pair of arcuate brake linings 21 are suitably secured or bonded to the arcuate flanges 21' of brake shoes 13 and are adapted upon application of the vehicle brakes for movement towards and frictional engagement with the interior arcuate surfaces 22 of the rotatable brake drums 12.

The brake lining wear indicating device includes the plastic or non-metallic housing 23 which is secured to the outer wall of brake shoe 13 by the strap 24 and the attaching screws 25 as shown in the drawing. Housing 23 has an elongated bore 26 which terminates in the bore 27 of increased diameter and the rod or shaft 28 extends through said bores.

The piston 29 upon the outer end of the rod 28 is positioned within the enlarged bore 27 in housing 23 and extends partially into the counterbore 31 upon the inner surface of lining 21 adjacent to the bore 27.

The outer end of housing 23 has a circular shoulder 30 of reduced diameter which is positioned through the corresponding transverse opening in the wall of the lining mounting flange 21' there being a suitable, preferably rubber, washer 36 interposed between housing 23 and the inner surface of the flange 21' as shown in Fig. 1.

Coiled spring 32 is positioned within the enlarged bore 27 and around the rod 28 with the outer end of said spring bearing against the piston 29 tending to urge the same outwardly of said housing.

Ground wire connector 33 is threadably secured over the outer projecting threaded end of rod 28 there being a rubber washer 35 and a fiber washer 34 positioned upon said rod and interposed between wire connector 33 and housing 23.

The ground wire 37 is joined at its lower end to wire connector 33 as shown in Fig. 1 and the upper end thereof extends to one of the terminals of the light signal or bulb 38 which is positioned within a suitable socket within the vehicle dash 39. Electrical energy is delivered to the other terminal of bulb 38 by the single wire 42 which interconnects said terminal with the electrically energized side of the vehicle ignition switch 41 positioned within the dash 39 which extends from and is joined to the vehicle frame 40.

Under normal operation the bulb 38 is not energized for the reason that the ground wire 37 is not effectively grounded to the vehicle body, being normally spaced from the metallic drum 12. However after there has been considerable wear of the brake lining 21 to the point where said linings should be replaced, it will be apparent from Fig. 1 of the drawing, that the outer end of piston 29 will be exposed, and upon outward movement of the brake shoe 13 upon application of the brakes, said rod 29 will come into physical contact with the inner surface 22 of said drum. Thus the electrical circuit through the signal device 38 will be completed and at that moment the bulb 38 will be energized.

This will indicate the condition of the brake linings 21 which if then replaced will prevent future scoring of the interior surface 22 of the brake drums 12. In the present embodiment a light bulb 38 is shown for illustration however it is contemplated that an audible signal such as a buzzer could be substituted therefor. In any event the present mechanism provides a practical device to indicate that it is time to replace brake linings 21.

While I have shown in Fig. 1 a rotatable disc 16 actuated by a lever 17 for expanding the brake shoes 13, it is naturally contemplated that any other suitable conventional or hydraulic mechanism may be employed for so expanding said brake shoes.

While the present construction has been directed to vehicle brake linings, it is naturally contemplated that the present lining wear indicating device may be used in any other industrial construction or equipment which requires the use of brake linings.

Having described my invention reference should now be had to the claim which follows for determining the scope thereof.

I claim:

A brake shoe lining wear switching means comprising in combination, a vehicle brake drum, a movable shoe, a lining thereon, a non-metallic housing secured to said shoe and having a longitudinal bore therethrough with the outer portion thereof of increased diameter, said lining having a counterbore in its inner surface adjacent the enlarged bore of said housing, a rod slidably extending through the bore of said housing, a piston on said rod positioned within said enlarged bore and extending partially into said counterbore, a coiled spring within said enlarged bore and bearing against said piston normally urging the same outwardly of said bore, whereby upon sufficient wear of said lining said piston will engage said drum on movement of the shoe towards said drum.

EDWARD A. BRANSCHOFSKY.

References Cited in the file of this patent

UNITED STATES PATENTS

| Number | Name | Date |
|---|---|---|
| 1,902,759 | Cataudella | Mar. 21, 1933 |
| 2,146,357 | Schweikle | Feb. 7, 1939 |
| 2,217,176 | Madison | Oct. 8, 1940 |
| 2,494,269 | Sparkes | Jan. 10, 1950 |

FOREIGN PATENTS

| Number | Country | Date |
|---|---|---|
| 118,360 | Great Britain | Aug. 29, 1918 |